United States Patent
Kenney, Jr.

(10) Patent No.: US 6,619,850 B1
(45) Date of Patent: Sep. 16, 2003

(54) THRUST BEARING ROLLER RETAINER ASSEMBLY

(75) Inventor: Joseph F. Kenney, Jr., Winsted, CT (US)

(73) Assignee: The Torrington Company, Torrington, CT (US)

( * ) Notice: Subject to any disclaimer, the term of this patent is extended or adjusted under 35 U.S.C. 154(b) by 20 days.

(21) Appl. No.: 10/074,276

(22) Filed: Feb. 12, 2002

(51) Int. Cl.[7] .................. F16C 33/66; F16C 19/30
(52) U.S. Cl. .............. 384/470; 384/606; 384/623
(58) Field of Search .................. 384/470, 606, 384/618–623

(56) References Cited

U.S. PATENT DOCUMENTS

| | | |
|---|---|---|
| 2,241,032 A | 5/1941 | Horrocks |
| 3,572,862 A * | 3/1971 | Teramachi .................. 384/621 |
| 3,778,124 A | 12/1973 | Alling |
| 3,785,710 A | 1/1974 | Alling |
| 3,876,267 A | 4/1975 | Schaeffler et al. |
| 3,972,575 A * | 8/1976 | Chiba et al. ................. 384/623 |
| 3,994,546 A * | 11/1976 | Alling .......................... 384/623 |
| 4,077,683 A | 3/1978 | Bhateja et al. |
| 4,225,200 A * | 9/1980 | Dougall ....................... 384/621 |
| 5,630,670 A | 5/1997 | Griffin et al. ............... 384/606 |
| 5,938,349 A | 8/1999 | Ogawa ......................... 384/615 |
| 6,102,580 A | 8/2000 | Alling et al. ............... 384/618 |
| 6,106,158 A | 8/2000 | Hayashi et al. ............. 384/623 |

* cited by examiner

Primary Examiner—Thomas R. Hannon
(74) Attorney, Agent, or Firm—Michael Best & Friedrich LLP

(57) ABSTRACT

A roller retainer assembly for an axial-thrust bearing comprising first and second annular retainer plates. At least one roller pocket extends through each annular plate. The first second annular retainer plates are interconnected such that the at least one first roller pocket is substantially circumferentially aligned with the at least one second roller pocket with the inner and outer radial edges of the opposed pockets offset from one another. As such, the first pocket defines a first fluid passage gap through the first annular plate between the roller and the first outer edge and the second pocket defines a second fluid passage gap through the second annular plate between the roller and the second inner edge.

10 Claims, 2 Drawing Sheets

THRUST BEARING ROLLER RETAINER ASSEMBLY

BACKGROUND

This invention relates generally to axial-thrust bearings and more particularly to a thrust bearing roller assembly that provides lubricant flow through the bearings to other components of a rotating machine.

There are two basic categories of bearing retainers, two piece assembled retainers and single piece wraparound retainers. A wraparound retainer is a single annular ring having a plurality of roller pockets for holding the bearing rollers. Typically, the sides of the pockets extend outward into fingers that wrap around and retain the roller. With many one-piece designs, it is difficult to ensure sufficient roller contacting surface or wrap-around and the single piece retainer usually requires special heat-treating.

A two piece retainer usually consists of two retainer halves, each half containing a plurality of roller pockets. The retainer halves are aligned with the pockets in alignment and then the two retainer halves are mechanically joined. These two-piece retainers have fair wrap-around and conformity to the roller shape.

A drawback of both single and two piece retainers is the necessity for lubricant to overcome considerable flow resistance in order to flow through the bearing. The resistance is caused in part by the narrow spaces between the rolling elements and the pockets on the retainers. The resistance is magnified in two piece retainers as there are two sets of pockets that the lubricant must flow through in order to pass through the bearing.

The foregoing illustrates limitations known to exist in present roller thrust bearings for use in rotating machines. Thus, it would be advantageous to provide an alternative directed to overcoming one or more of the limitations set forth above. Accordingly, a suitable alternative is provided including features more fully disclosed hereinafter.

SUMMARY

The present invention relates to a roller retainer assembly for an axial-thrust bearing. The assembly comprises first and second annular retainer plates. At least one first roller pocket extends through the first annular plate and is defined by opposed first side edges and a first radially inner edge opposed with a first radially outer edge. At least one second roller pocket extends through the second annular plate and is defined by opposed second side edges and a second radially inner edge opposed with a second radially outer edge. The first and second annular retainer plates are interconnected such that the at least one first roller pocket is substantially circumferentially aligned with the at least one second roller pocket. The first roller pocket inner edge is radially offset a distance Y from the corresponding second roller pocket inner edge and the first roller pocket outer edge is radially offset a distance X from the corresponding second roller pocket outer edge, thereby defining at least one roller retaining area for receipt and retention of at least one roller. The roller retaining area is defined by the first and second opposed side edges and the first radially inner edge and the second radially outer edge. As such, the first pocket defines a first fluid passage gap through the first annular plate between the roller and the first outer edge and the second pocket defines a second fluid passage gap through the second annular plate between the roller and the second inner edge.

DETAILED DESCRIPTION OF THE PREFERRED EMBODIMENTS

The present invention will be described with reference to the accompanying drawing figures wherein like numbers represent like elements throughout. Certain terminology, for example, "top", "bottom", "right", "left", "front", "frontward", "forward", "back", "rear" and "rearward", is used in the following description for relative descriptive clarity only and is not intended to be limiting.

Figure 1:
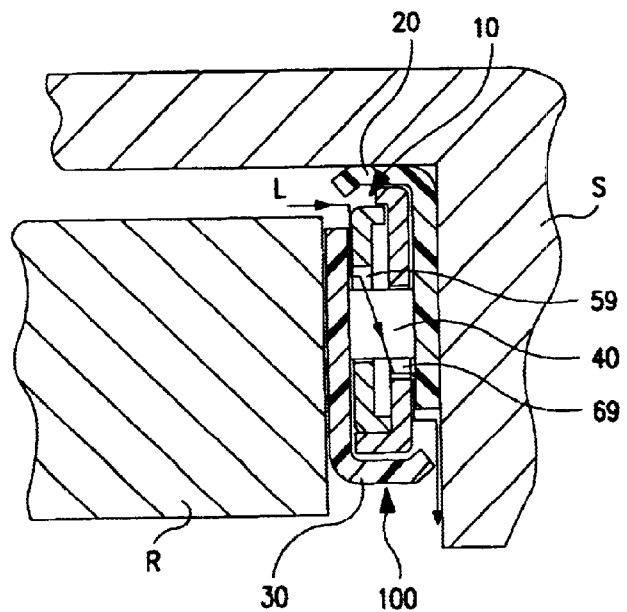
FIG. 1 is a schematic elevation sectional view showing the roller thrust bearing of the invention in a rotating machine.

Referring to FIG. 1, the thrust bearing assembly 100 generally consists of an annular outer race 20 with a flat radially projecting member and a cylindrical outer wall, an annular inner race 30 with a flat radially projecting member and a cylindrical inner wall and an annular roller retainer assembly 10 including cylindrical rollers 40. The roller retainer assembly 10 has a plurality of aligned, substantially rectangular upper and lower roller pockets 56, 66. The size and number of pockets 56, 66 and rollers 40 depends on the size and load capacity of the bearing 100. The roller diameters are sufficient to support the inner race 30 and outer race 20 clear of the roller retainer assembly 10 during operation. The clearance between the races and retainer assembly 10 is sufficient to permit passage of a thin film of lubricant over and through the retainer assembly 10 to provide lubrication to the rollers 40 and the races 20, 30, and to remove frictional heat from the assembly.

FIG. 1 shows a longitudinal section taken through a roller pocket of a roller thrust bearing 100 of the invention installed in a rotating machine. The bearing is shown with its inner race 30 supporting a rotating member "R" and resting on its outer race 20 on a stationary member "S" of the machine. The roller 40 supports the outer race 20 from the inner race 30 with sufficient clearance for the roller retainer assembly 10, supported by and supporting a film of lubricant between the retainer and the races, to be free of both races. Lubricant flow "L" is downward between the inner wall of inner race 30 and the inner surface of the retainer 10, axially through the upper roller pocket gap 59, around the roller 40, through the lower roller pocket gap 69 and downward between the outer surface of the retainer assembly 10 and the cylindrical outer wall of the outer race 20. The rotating member R, the stationary member S and the races 20, 30 are for illustrative purposes only. Other race assemblies can be utilized with the retainer assembly 10 of the present invention and the thrust bearing can be utilized in various applications.

Figure 2:
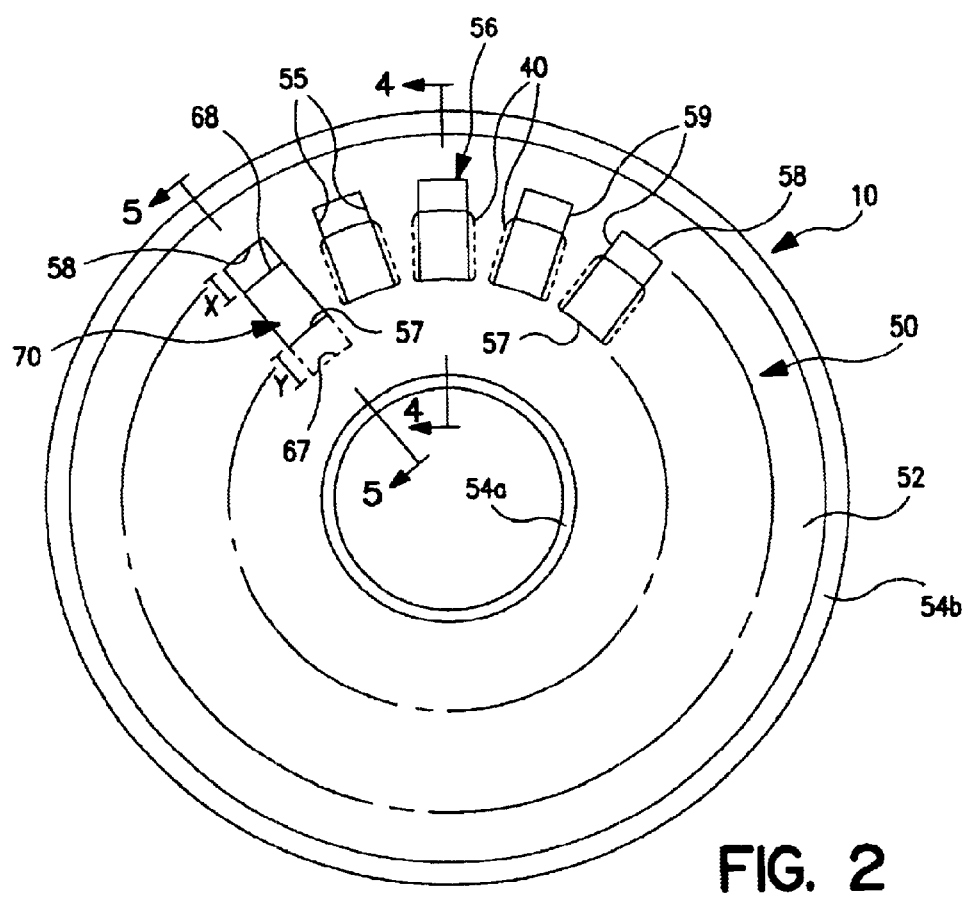
FIG. 2 is top plan view of a roller retainer assembly of the present invention.
Figure 3:
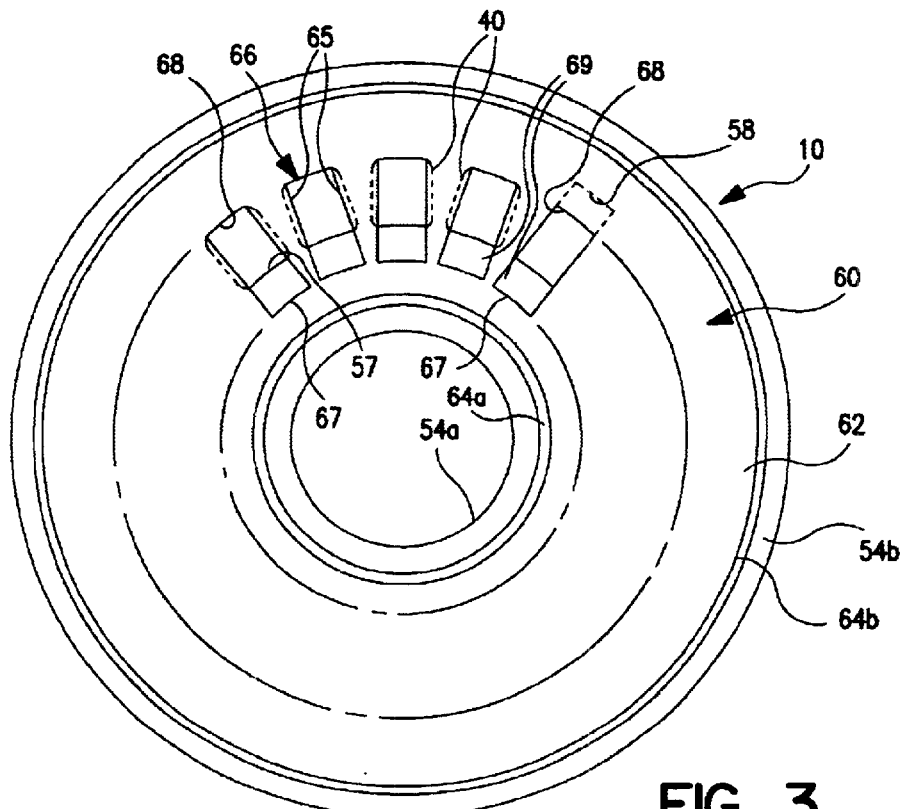
FIG. 3 is bottom plan view of the roller retainer assembly of FIG. 2.
Figure 4:
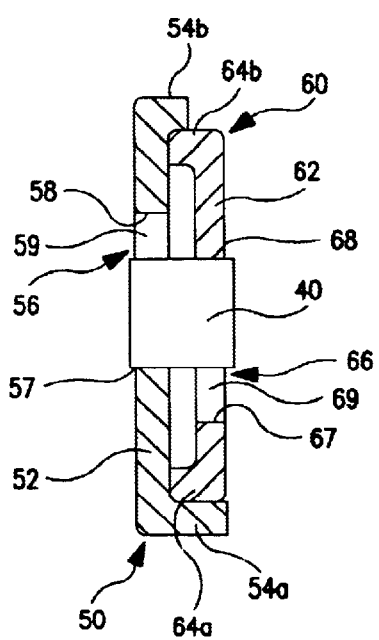
FIG. 4 is an enlarged sectional view through the roller retainer assembly along line 4—4 of FIG. 2.

Referring to FIGS. 2–4, the preferred retainer assembly 10 generally comprises a pair of opposed retainer plates 50 and 60 and a plurality of rolling elements 40. Retainer plate 50 includes an annular plate 52 having a radially inner collar 54a and a radially outer collar 54b, each collar 54a, 54b extending substantially perpendicular to the annular plate 52. The annular plate 52 has a circumferential row of pockets 56 defined therein. Each pocket 56 preferably has a rectangular configuration delimited by opposed side edges 55 and opposed radially inner edge 57 and radially outer edge 58. The opposed side edges 55 are spaced apart a distance slightly smaller than the diameter of the corresponding rollers 40 and the opposed inner and outer edges 57 and 58 are spaced apart a distance greater than the length of the corresponding rollers 40.

Retainer plate 60 includes an annular plate 62 having a radially inner collar 64a and a radially outer collar 64b, each collar 64a, 64b extending substantially perpendicular to the annular plate 62. The annular plate 62 has a circumferential row of pockets 66 defined therein. Each pocket 66 preferably has a rectangular configuration delimited by opposed side edges 65 and opposed radially inner edge 67 and radially outer edge 68. The opposed side edges 65 are spaced apart a distance slightly smaller than the diameter of the corresponding rollers 40 and the opposed inner and outer edges 67 and 68 are spaced apart a distance greater than the length of the corresponding rollers 40.

Retainer plates 50 and 60 are brought together with their respective collars 54a, 54b and 64a, 64b toward one another to define a plurality of roller retaining areas 70 as explained below. Rollers 40 are positioned in the roller retaining areas 70 and the mated plates joined, for example, by riveting, welding, flaring, or spinning over, to form a unitized roller retainer assembly 10. To define the retaining areas 70, the retainer plates 50 and 60 are aligned such that pockets 56 of plate 50 are circumferentially aligned with the pockets 66 of plate 60, i.e., the side edges 55 of a pocket 56 are substantially aligned with the side edges 65 of a corresponding pocket 66. In the radial direction, the inner edges 57 and 67 are radially offset from one another as are the outer edges 58 and 68.

Figure 5:
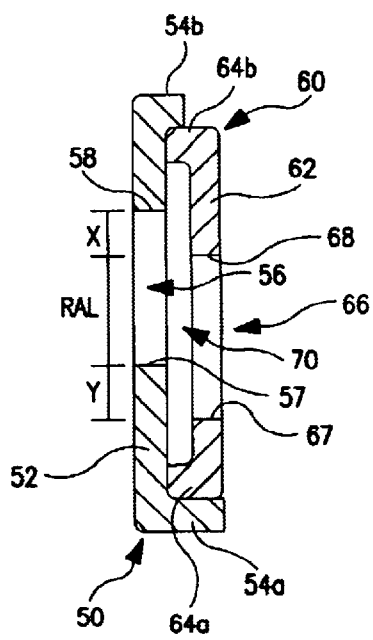
FIG. 5 is an enlarged sectional view through the roller retainer assembly along line 5—5 of FIG. 2 ignoring the roller.

Referring to FIGS. 2 and 5, outer edge 58 is spaced outward from edge 68 by a distance X and inner edge 57 is spaced outward from edge 67 by a distance Y. As such, the roller retaining area 70 is defined between the opposed side edges 55 and 65 and the two centermost radial edges, namely, between edge 57 of pocket 56 and edge 68 of pocket 66. The side edges 55 and 65 overlap the edges of an inserted roller 40 to maintain the roller 40 between the retainer plates 50 and 60 and to prevent circumferential movement or radial tilting of the roller 40. The opposed radial edges 57 and 68 are spaced apart a distance RAL approximate the length of the roller 40 to define the radial position of the roller 40 and prevent radial movement thereof. The distance RAL of the radial edges 57 and 68 may be slightly larger than the roller length to provide a slight tolerance clearance. That is, the retaining area length RAL is equal to the roller length plus a slight tolerance distance.

Each pocket 56, 66 has a length between radial edges 57,58 and 67,68 greater than the retaining area length RAL. As a result, each pocket 56, 66 defines a fluid passage gap 59, 69 between the roller 40 and the respective, non-contacted radial edge, namely 58 and 67, respectively. Each fluid passage gap 59, 69 has a radial length equal to the corresponding radial edge offset X, Y plus a portion of the slight tolerance distance. That is, fluid passage gap 59 has a radial length equal to offset length X plus a first portion of the slight tolerance distance and fluid passage gap 69 has a radial length equal to offset length Y plus the remainder of the slight tolerance distance. The lengths of the fluid passage gaps 59 and 69 may be equal, but do not have to be equal. As seen in FIG. 4, the fluid passage gaps 59 and 69 are on opposite ends of the roller 40 thereby promoting a fluid flow through the retainer assembly 10 that is across the roller 40.

It will be appreciated by those skilled in the art that changes can be made to the embodiments described above without departing from the broad inventive concept thereof. It is understood, therefore, that this invention is not limited to the particular embodiments disclosed, but it is intended to cover modifications within the spirit and scope of the present invention as generally and illustratively described herein.

What is claimed is:

1. A roller retainer assembly for an axial-thrust bearing, the assembly comprising:

a first annular retainer plate;

a plurality of circumferentially-arrayed substantially rectangular first roller pockets extending through the first annular plate, each first pocket defined by opposed first side edges and a first radially inner edge opposed with a first radially outer edge;

a second annular retainer plate;

a plurality of circumferentially-arrayed substantially rectangular second roller pockets extending through the second annular plate, each second pocket defined by opposed second side edges and a second radially inner edge opposed with a second radially outer edge;

a plurality of rollers;

the first and second annular retainer plates being interconnected such that the first roller pockets are substantially circumferentially aligned with the second roller pockets with the first roller pocket inner edges radially offset a distance Y from the corresponding second roller pocket inner edges and the first roller pocket outer edges radially offset a distance X from the corresponding second roller pocket outer edges such that a plurality of roller retaining areas are defined for receipt and retention of a roller, each roller retaining area defined by the first and second opposed side edges and the first inner radial edge and the second outer radial edge;

each first pocket defining a first fluid passage gap through the first annular plate between the roller and the first outer edge; and each second pocket defining a second fluid passage gap through the second annular plate between the roller and the second inner edge.

2. The roller retainer assembly according to claim 1 wherein X and Y are equal.

3. The roller retainer assembly according to claim 1 wherein X and Y are unequal.

4. The roller retainer assembly according to claim 1 wherein each roller has a given radial length and each roller retaining area having a radial length between the first inner radial edge and the second outer radial edge equal to the roller radial length plus a tolerance distance.

5. The roller retainer assembly according to claim 4 wherein the first fluid passage gap has a radial length equal to X plus a portion of the tolerance distance and the second fluid passage gap has a radial length equal to Y plus the remainder of the tolerance distance.

6. A roller retainer assembly for an axial-thrust bearing, the assembly comprising:

a first annular retainer plate;

at least one first roller pocket extending through the first annular plate and defined by opposed first side edges and a first radially inner edge opposed with a first radially outer edge;

a second annular retainer plate;

at least one second roller pocket extending through the second annular plate and defined by opposed second side edges and a second radially inner edge opposed with a second radially outer edge;

at least one roller element;

the first and second annular retainer plates being interconnected such that the at least one first roller pocket is substantially circumferentially aligned with the at least one second roller pocket with the first roller pocket inner edge radially offset a distance Y from the corresponding second roller pocket inner edge and the first roller pocket outer edge radially offset a distance X from the corresponding second roller pocket outer edge such that at least one roller retaining area is defined for receipt and retention of the at least one roller, the roller retaining area defined by the first and second opposed side edges and the first radially inner edge and the second radially outer edge;

the first pocket defining a first fluid passage gap through the first annular plate between the roller and the first outer edge; and the second pocket defining a second fluid passage gap through the second annular plate between the roller and the second inner edge.

7. The roller retainer assembly according to claim 6 wherein X and Y are equal.

8. The roller retainer assembly according to claim 6 wherein X and Y are unequal.

9. The roller retainer assembly according to claim 6 wherein the at least one roller has a given radial length and the roller retaining area has a radial length between the first inner radial edge and the second outer radial edge equal to the roller radial length plus a tolerance distance.

10. The roller retainer assembly according to claim 9 wherein the first fluid passage gap has a radial length equal to X plus a portion of the tolerance distance and the second fluid passage gap has a radial length equal to Y plus the remainder of the tolerance distance.

* * * * *